United States Patent
Rivolta et al.

(10) Patent No.: US 12,535,352 B2
(45) Date of Patent: Jan. 27, 2026

(54) METHOD FOR DETECTING THE PRESENCE OF A LIQUID

(71) Applicant: STMICROELECTRONICS S.r.l., Agrate Brianza (IT)

(72) Inventors: Stefano Paolo Rivolta, Desio (IT); Andrea Labombarda, Milan (IT); Carlo Guadalupi, Sedriano (IT); Mauro Bardone, Cava Manara (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 345 days.

(21) Appl. No.: 18/458,765

(22) Filed: Aug. 30, 2023

(65) Prior Publication Data

US 2024/0142294 A1    May 2, 2024

(30) Foreign Application Priority Data

Oct. 31, 2022  (IT) .................. 102022000022386

(51) Int. Cl.
*G01F 23/00*   (2022.01)
*G01F 23/80*   (2022.01)

(52) U.S. Cl.
CPC ........ *G01F 23/804* (2022.01); *G01F 23/0007* (2013.01)

(58) Field of Classification Search
CPC .......................... G01F 23/804; G01F 23/2007

(Continued)

(56) References Cited

U.S. PATENT DOCUMENTS

| 6,820,483 B1* | 11/2004 | Beckerman ........... G01F 23/243<br>73/304 C |
| 8,789,414 B2* | 7/2014 | Park ..................... G01F 23/268<br>73/304 C |

(Continued)

FOREIGN PATENT DOCUMENTS

| EP | 2980609 A1 | 2/2016 |
| KR | 20110061750 A | 6/2011 |

OTHER PUBLICATIONS

"Conductivity Level Switches," LVCF/LVCR/LVCP Series. (4 pages).

(Continued)

*Primary Examiner* — Peter J Macchiarolo
*Assistant Examiner* — Rodney T Frank
(74) *Attorney, Agent, or Firm* — Seed Intellectual Property Law Group LLP (57) ABSTRACT

The present disclosure is directed to a method for detecting a liquid on a main surface of a body. The method is performed through a detection device including a processing module, a reference electrode at a reference electric voltage and a first sensing electrode on the main surface and configured to detect an environmental electric and/or electrostatic charge variation indicative of the presence of the liquid. The method includes the steps of: biasing the first sensing electrode to a bias electric voltage; while the first sensing electrode is at the bias electric voltage, acquiring a first charge variation signal indicative of the electric and/or electrostatic charge variation detected by the first sensing electrode; verifying whether the first charge variation signal is indicative of the presence of the liquid on the main surface, at the first sensing electrode; and, if it is, determining the presence of the liquid on the main surface at the first sensing electrode.

19 Claims, 6 Drawing Sheets

(58) Field of Classification Search
USPC .................................................. 73/290 R
See application file for complete search history.

(56) References Cited

U.S. PATENT DOCUMENTS

| | | |
|---|---|---|
| 2005/0247330 A1 | 11/2005 | Land et al. |
| 2006/0021432 A1 | 2/2006 | Salzmann et al. |
| 2008/0163758 A1* | 7/2008 | Jeong .................... G01F 23/265 |
| | | 122/494 |
| 2012/0073366 A1 | 3/2012 | Molinaro et al. |
| 2014/0232516 A1 | 8/2014 | Stivoric et al. |
| 2015/0276544 A1 | 10/2015 | Osoinach et al. |
| 2016/0342781 A1 | 11/2016 | Jeon |
| 2019/0078924 A1 | 3/2019 | Bender |
| 2019/0178699 A1 | 6/2019 | Wistuba |
| 2020/0025843 A1* | 1/2020 | Crescentini ............ G01R 33/07 |
| 2021/0396819 A1* | 12/2021 | Crescentini ........ G01R 33/0005 |
| 2022/0072373 A1 | 3/2022 | Alessi et al. |

OTHER PUBLICATIONS

"Misura di livello capacitiva robusta ed affidabile," Sensore Di Livello Capacitivo Per Liquidi in Acciaio Inox. (2 pages) (with English Translation).

* cited by examiner

METHOD FOR DETECTING THE PRESENCE OF A LIQUID

BACKGROUND

Technical Field

The present disclosure relates to detecting the presence of a liquid.

Description of the Related Art

As known, several applications require the measurement of the liquid level in a container (e.g., water in a cistern) or the detection of liquid leaks (e.g., water dripping from a cistern and accumulating on an accumulation surface such as a floor or a portion of machinery).

In particular, the measurement of the liquid level in the container allows the amount of liquid present in the container to be accurately monitored and anomalous conditions (e.g., the container is almost empty or is excessively full, to the point of risking overflowing) to be signaled. Instead, detecting the presence of liquid on the accumulation surface allows adopting, if the condition requires it, safety features that prevent the liquid leakage from damaging surrounding objects (e.g., the operation of a machinery may be stopped when a water leakage from a machinery tank accumulates in parts of the machinery which may damage as a result of this leakage, for example electric/electronic circuits of the machinery).

Several solutions for detecting liquid are known.

For example, it is known to perform a measurement of the liquid level through float, optical, ultrasonic (e.g., of the time-of-flight type), resistive or capacitive sensors. However, these known sensors have multiple disadvantages and limitations.

For example, float sensors (e.g., floats present in cisterns to measure the level of water present) are bulky and inaccurate.

Optical sensors are expensive and often bulky.

Ultrasonic sensors generally require a very complex processing of the acquired data in order to achieve measurement accuracies suitable for these applications, therefore they require high computational resources.

Capacitive sensors are based on the detection of capacitance variation between two frames of a capacitor, induced by the presence of the liquid. However, this imposes constraints on the design of the capacitor (e.g., the distance and the dimension of the frames of the capacitor are fixed according to the dielectric present between the frames and the electrostatic properties of the liquid to be detected); this makes the capacitor hardly scalable and therefore the sensor rather bulky and cumbersome. Furthermore, capacitive sensors have low sensitivity since their measurement depends on the amount of liquid present between the frames of the capacitor and have high electrical power consumption in order to operate (e.g., of the order of magnitude of hundreds of mW).

Known resistive sensors are based on the biasing of electrodes through a bias current and on the measurement of the electric voltage difference between the two electrodes, in order to calculate an electric resistance between the electrodes which varies according to the presence or absence of the liquid between the electrodes. This approach requires an accurate calibration of the reference resistance between the electrodes (i.e., in the absence of liquid); in fact, an incorrect calibration may lead to a very low measurement accuracy. Furthermore, the need to electrically bias the electrodes causes high power consumptions (e.g., the bias currents are of the order of magnitude of hundreds of mA) and requires some design constraints to be respected on the electrodes (which, in particular, need to maintain preset dimensions to dissipate the heat generated and cannot be miniaturizable, therefore they are bulky).

The present disclosure provides a method for detecting the presence of a liquid, a detection device, a detection system and a computer program product thereof which overcome the drawbacks of the prior art.

BRIEF SUMMARY

According to the present disclosure, a method for detecting the presence of a liquid, a detection device, a detection system and a computer program product thereof are provided.

The method is performed by detection device including a processing module, a reference electrode at a reference electric voltage, and a first sensing electrode on the main surface and configurated to detect an environmental electric and/or electrostatic charge variation indicative of the presence of the liquid. The method includes the steps of: biasing the first sensing electrode to a bias electric voltage; while the first sensing electrode is at the bias electric voltage, acquiring a first charge variation signal indicative of the electric and/or electrostatic charge variation detected by the first sensing electrode; verifying whether the first charge variation signal is indicative of the presence of the liquid on the main surface, at the first sensing electrode; and, if it is, determining the presence of the liquid on the main surface at the first sensing electrode.

BRIEF DESCRIPTION OF THE SEVERAL VIEWS OF THE DRAWINGS

For a better understanding of the present disclosure, various embodiments are now described, purely by way of non-limiting example, with reference to the attached drawings, wherein.

DETAILED DESCRIPTION

In particular, the Figures are shown with reference to a triaxial Cartesian system defined by an X axis, a Y axis and a Z axis, orthogonal to each other.

In the following description, elements common to the different embodiments have been indicated with the same reference numerals.

Figure 1:
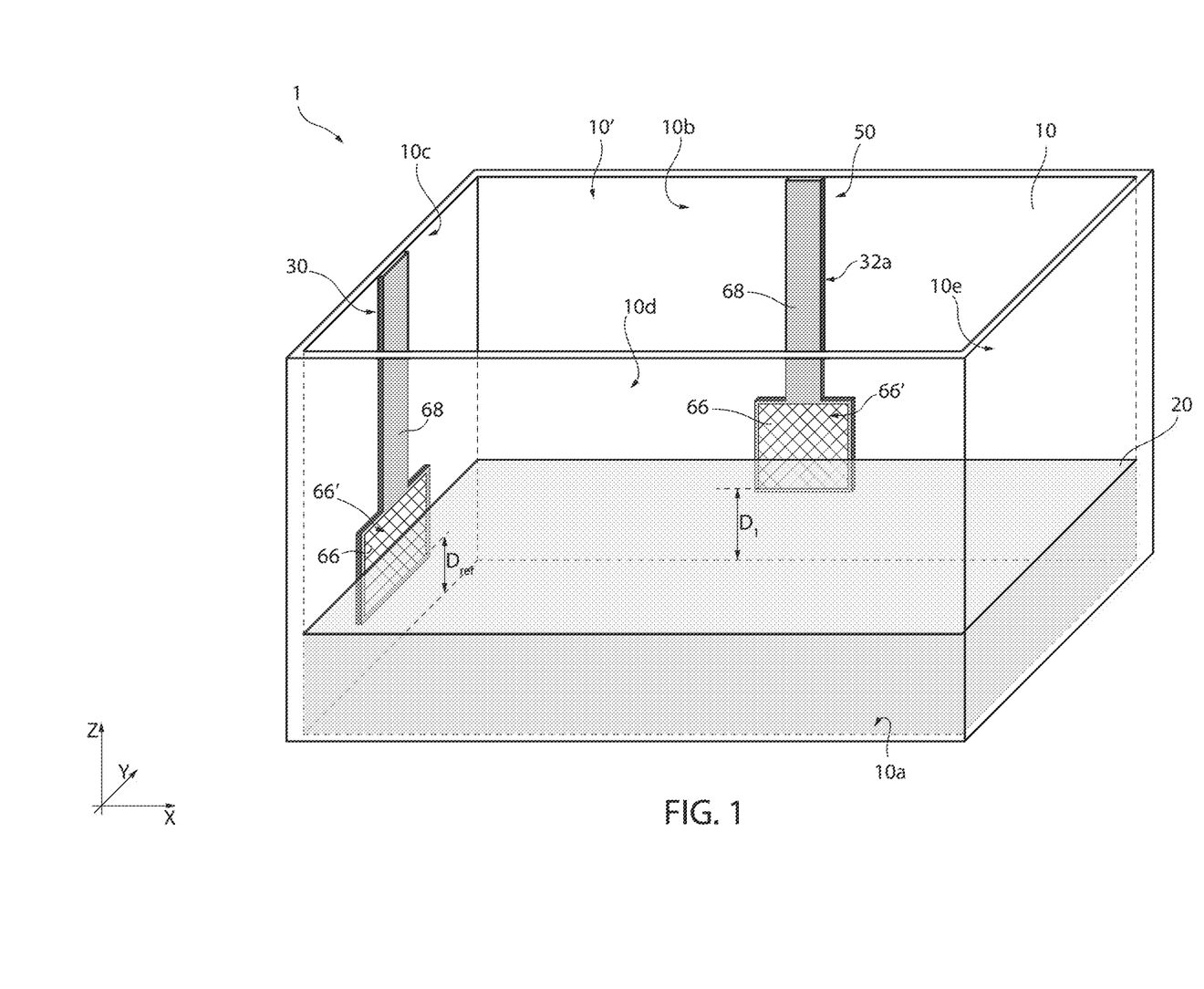
FIG. 1 shows a detection system comprising a body containing a liquid and a detection device coupled to the body, according to an embodiment of the present disclosure.

FIG. 1 shows a detection system 1, according to an exemplary embodiment.

The detection system 1 comprises a body 10, for example a container for liquid (e.g., a tank or a cistern) for containing a liquid 20 (e.g., water such as fresh or salt water with different levels of salinity, ammonia, acids such as hydrochloric or hydrofluoric acid, chlorides, nitrates, sulfates), and a detection device 50 which is physically coupled to the body 10 and which in use implements a detection method 100 to detect the presence of the liquid 20 in the body 10.

In the exemplarily considered embodiment, the body 10 is a container for liquid and comprises a lower wall (or bottom wall or base) 10a and side walls 10b-10e coupled to each other (e.g., the side walls 10b-10e are contiguous to the lower wall 10a and are fixed to respective sides of the latter to form a structure having, for example, a cubic or a parallelepiped shape). For example, the lower wall 10a extends parallel to an XY plane defined by the X and Y axes and the side walls 10b-10e extend orthogonally to the lower wall 10a.

The side walls 10b-10e and the lower wall 10a define an inner space 10' of the container 10 for containing the liquid 20. For example, the inner space 10' is accessible from the outside of the container 10 through an opening, for example provided with a closing element such as a plug or a valve and for example extending, along the Z axis, on the opposite side of the container 10 with respect to the lower wall 10a.

The body 10 comprises a main surface 10b which is an inner surface (i.e., facing the inner space 10') of the lower wall 10a or of one of the side walls 10b-10e. In the embodiment of FIG. 1, the main surface 10b is exemplarily the inner surface of the side wall 10b (hereinafter also referred to as first side wall 10b).

The detection device 50 comprises a processing module or circuitry 52 (shown in FIG. 2), a reference electrode 30 and one or more sensing electrodes 32. In the embodiment of FIG. 1 one sensing electrode 32 is exemplarily considered (hereinafter also referred to as first sensing electrode 32a), although it is clear that the number of sensing electrodes 32 may be greater.

The reference electrode 30 and the first sensing electrode 32a are electrically coupled to the processing module 52 and form with the latter an electric and/or electrostatic charge variation sensor (hereinafter referred to as charge variation sensor) for detecting the liquid 20.

Figure 2:
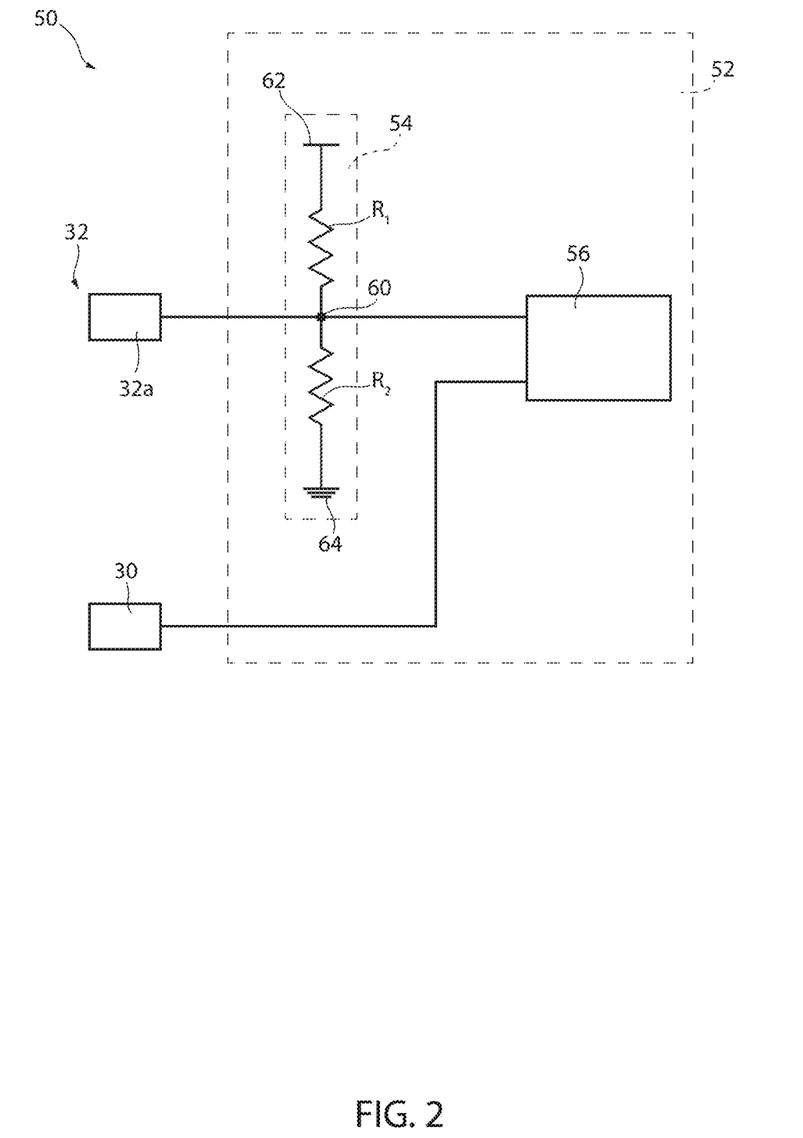
FIG. 2 schematically shows the detection device of FIG. 1, according to an embodiment.

In particular and as better shown in FIG. 2, the processing module 52 comprises a bias circuit 54 for each sensing electrode 32, and a sensor control unit 56. In the case considered in FIG. 1, a first bias circuit 54 is present.

In particular and in a manner not shown, the sensor control unit 56 comprises a control unit configured to process data (e.g., a microprocessor or a dedicated processing unit) and, optionally, an interface unit configured to receive signals from the electrodes 30, 32 and pre-process them before sending them to the control unit. For example, the interface unit may comprise at least one of the following: a charge-to-voltage conversion module or circuitry (e.g., a charge amplifier), a filtering module or circuitry (in particular, low-pass filtering with cut-off frequency at a few Hz or tens of Hz, e.g., at about 10 Hz), an amplification module or circuitry, a sub-sampling module or circuitry (e.g., with a sub-sampling factor comprised between about 2 and about 240 and for example equal to about 8). The sensor control unit 56 may be any type of controller, processor, or processing circuitry configured to process data.

The sensor control unit 56 is electrically coupled to the reference electrode 30 and, through the first bias circuit 54, to the first sensing electrode 32a.

In detail, the first sensing electrode 32a and the reference electrode 30 may each have a metal surface; they may also be made of a metal coated with dielectric material or have a metal surface placed under a case of insulating material, provided that a metal portion remains exposed so as to be in direct electric and/or electrostatic contact with the liquid 20. For example, in FIG. 1 each of the electrodes 32a and 30 comprises a sensing element 66 of electrically conductive material (e.g., metal such as gold or copper) and a coating 68 of electrically insulating material which surrounds the sensing element 66 leaving exposed a portion 66' thereof which is intended to be in direct electric and/or electrostatic contact with the liquid 20. In any case, other embodiments are possible as evident to the person skilled in the art, so that the electrodes 30 and 32a are electrically and/or electrostatically coupled with the outer environment during use, and more in particular with the liquid 20.

In use, the reference electrode 30 is at a reference electric voltage $V_{GND}$ (for example, it is grounded and therefore at about 0 V).

Furthermore, the reference electrode 30 is arranged in such a way that, when the liquid 20 is present on the main surface 10b (in particular, at the first sensing electrode 32a), the reference electrode 30 is immersed in the liquid 20 and therefore is in direct electric/electrostatic contact with the latter. In detail, the reference electrode 30 extends (e.g., is fixed, for example by bonding) on the inner surface of the lower wall 10a or on the inner surface of one of the side walls 10b-10e, in the latter case at a reference distance $D_{ref}$ from the inner surface of the lower wall 10a which is smaller than, or equal to, a first distance $D_1$ between the first sensing electrode 32a and the inner surface of the lower wall 10a. In this manner, when the liquid 20 touches the first sensing electrode 32a, the liquid 20 is also in direct electric/electrostatic contact with the reference electrode 30. For example, the first distance $D_1$ and the reference distance $D_{ref}$ are measured parallel to the Z axis and are the minimum distances between the lower wall 10a and the electrodes 32a and 30, in detail from the exposed portions 66' of the sensing elements 66. In FIG. 1, the reference electrode 30 exemplarily extends on the inner surface of the second side wall 10c, although it is evident that it may similarly extend on any side wall 10b-10e.

The first sensing electrode 32a extends (e.g., is fixed, for example by bonding), in FIG. 1, on the main surface 10b, in particular at the first distance $D_1$ from the inner surface of the lower wall 10a.

In use, the first sensing electrode 32a is biased, by the first bias circuit 54, to a bias electric voltage $V_E$ different from the reference electric voltage $V_{GND}$.

In use, the first sensing electrode 32a detects an environmental electric and/or electrostatic charge variation (i.e., generated by the interaction of the liquid 20 with the surrounding environment) and generates a respective first detection signal $S_{Ra}$ indicative of said electric and/or electrostatic charge variation.

Since the reference electrode 30 is at the reference electric voltage $V_{GND}$ and the first sensing electrode 32a is biased to the bias electric voltage $V_E$, when the liquid 20 is present at the first sensing electrode 32a, the liquid 20 is in direct electric/electrostatic contact both with the reference electrode 30 and with the first sensing electrode 32a. Consequently, the liquid 20 creates a conductive path between the reference electrode 30 and the first sensing electrode 32a and therefore allows the transfer of electric and/or electrostatic charge between the first sensing electrode 32a and the reference electrode 30. For this purpose, the liquid 20 is electrically/electrostatically conductive and has for example an electrical conductivity greater than about 10 μS/cm.

As shown in FIG. 2, the first bias circuit 54 is electrically interposed between the first sensing electrode 32 and the sensor control unit 56. In particular, the first bias circuit 54 comprises a first resistor $R_1$ and a second resistor $R_2$ electrically coupled to each other through a central node 60 of the first bias circuit 54. The central node 60 is also interposed between the first sensing electrode 32a and the sensor control unit 56. In greater detail, the second resistor $R_2$ extends between the central node 60 and a reference node 64 of the first bias circuit 54, which in use is at the reference electric voltage $V_{GND}$ (e.g., grounded). Furthermore, the first resistor $R_1$ extends between the central node 60 and an electrical power source 62 of the bias circuit 54, which in use provides a power supply voltage $V_{DD}$ (for example comprised between about 1.8 V and about 3.3 V). The series of the first and the second resistors $R_1$ and $R_2$ forms a voltage divider which causes, in use, the central node 60 (and therefore the first sensing electrode 32a) to be at the bias electric voltage $V_E$. In other words, the first bias circuit 54 has, in series with each other, the electrical power source 62, the first resistor $R_1$, the central node 60, the second resistor $R_2$ and the reference node 64; for example, the first sensing electrode 32a and the sensor control unit 56 are in parallel with each other and with respect to the second resistor $R_2$. Furthermore, in greater detail, the first and the second resistors $R_1$ and $R_2$ have respective resistances which are comparable to an input impedance of the sensor control unit 56 (e.g., are comprised in the range of about ±30% with respect to the input impedance of the sensor control unit 56); for example, the resistances of the first and the second resistors $R_1$ and $R_2$ are comprised between about 500 kΩ and about 50 MΩ and are for example equal to about 10 MΩ. In particular, the first and the second resistors $R_1$ and $R_2$ have the same resistance value, so that $V_E = V_{DD}/2$ (therefore $V_E$ is for example comprised between about 0.9 V and about 1.65 V).

It has been verified that the presence of the first bias circuit 54 improves the detection accuracy of the presence of the liquid 20 in the container 10, in particular by reducing the number of false positives of the measurement. In detail, the first bias circuit 54 allows filtering electric and/or electrostatic charge variations of small extent (i.e., not indicative of the presence of the liquid 20 but due to noise in the measurement or perturbations due to outer factors and, in particular, of maximum value or short time duration, as better discussed hereinbelow) and allows the electric and/or electrostatic charge variations of significant extent (therefore due to the presence of the liquid 20) to reach the sensor control unit 56. In fact, the first bias circuit 54 forces the working point of the first sensing electrode 32a to the bias electric voltage $V_E$. This causes the small charge variations detected by the first sensing electrode 32a not to significantly modify the working point of the first sensing electrode 32a and instead propagate towards the electrical power source 62 or towards the reference node 64, according to their sign, without therefore reaching the sensor control unit 56: in detail, positive charge variations propagate towards the grounded reference node 64, while negative charge variations propagate towards the electrical power source 62. On the other hand, when the charge variations are high enough to modify the working point of the first sensing electrode 32a (in particular, they are indicative of the presence of the liquid 20 at the first sensing electrode 32a), they propagate through the first bias circuit 54 and are acquired by the sensor control unit 56.

Figure 3A:
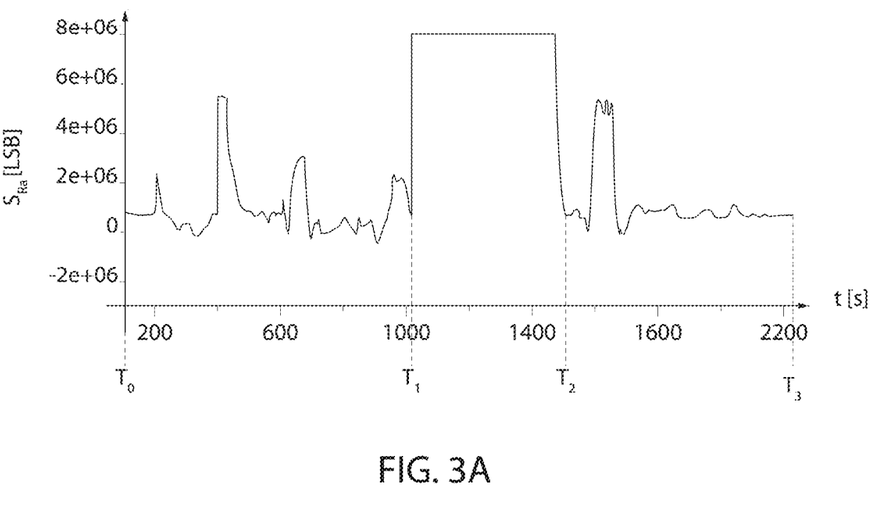
FIGS. 3A and 3B are graphs of a detection signal acquired through the detection device, respectively in case of absence and presence of a bias circuit of the detection device.
Figure 3B:
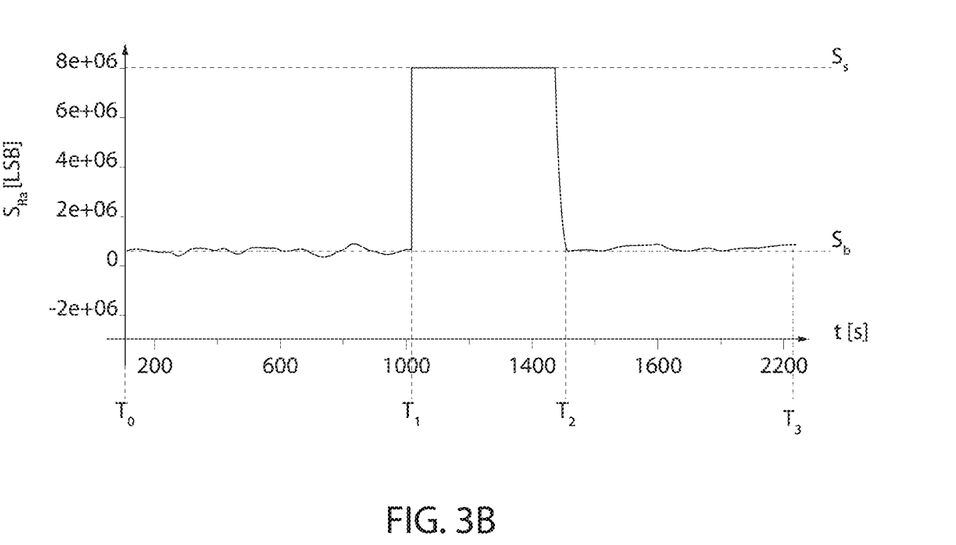

By way of example, FIGS. 3A and 3B show the first detection signal $S_{Ra}$ in case of absence and in case of presence of the first bias circuit 54, respectively. This first detection signal $S_{Ra}$ refers to the case in which a first time interval $T_0 \leq t < T_1$ in which the liquid 20 is absent (or in any case does not have a level sufficient to reach the first sensing electrode 32a), a second time interval $T_1 \leq t < T_2$ in which the liquid 20 is present (or in any case has a level sufficient to reach the first sensing electrode 32a) and a third time interval $T_2 \leq t < T_3$ in which the liquid 20 is absent (or in any case does not have a level sufficient to reach the first sensing electrode 32a) are present. From FIGS. 3A and 3B it is evident how the presence of the first bias circuit 54 allows, during the first and the third time intervals, eliminating spurious peaks of the first detection signal $S_{Ra}$ which might lead to erroneous detections of the presence of the liquid 20; in fact, in FIG. 3B, in the first and third time intervals the first detection signal $S_{Ra}$ remains substantially constant at a baseline value $S_b$ much lower than the saturation value $S_s$ of the second time interval (e.g., lower by about one order of magnitude). In detail, the saturation value of the first detection signal $S_{Ra}$ is predefined during the design step and depends on factors such as the geometry, the area and the material of the first sensing electrode 32a, on the electric/ electrostatic properties of the first sensing electrode 32a, etc.; purely by way of non-limiting example, the saturation value of the first detection signal $S_{Ra}$ is comprised between about 127 LSB and about 8388607 LSB and is, for example, equal to about 32767 LSB (e.g., values corresponding to the output of an analog-to-digital converter, ADC, of the sensor control unit 56). The first bias circuit 54, on the other hand, does not significantly modify the first detection signal $S_{Ra}$ during the second time interval, where the first detection signal $S_{Ra}$ assumes the saturation value in both cases due to the presence of the liquid 20 which allows the transfer of electric and/or electrostatic charge between the electrodes 30 and 32a.

Figure 4:
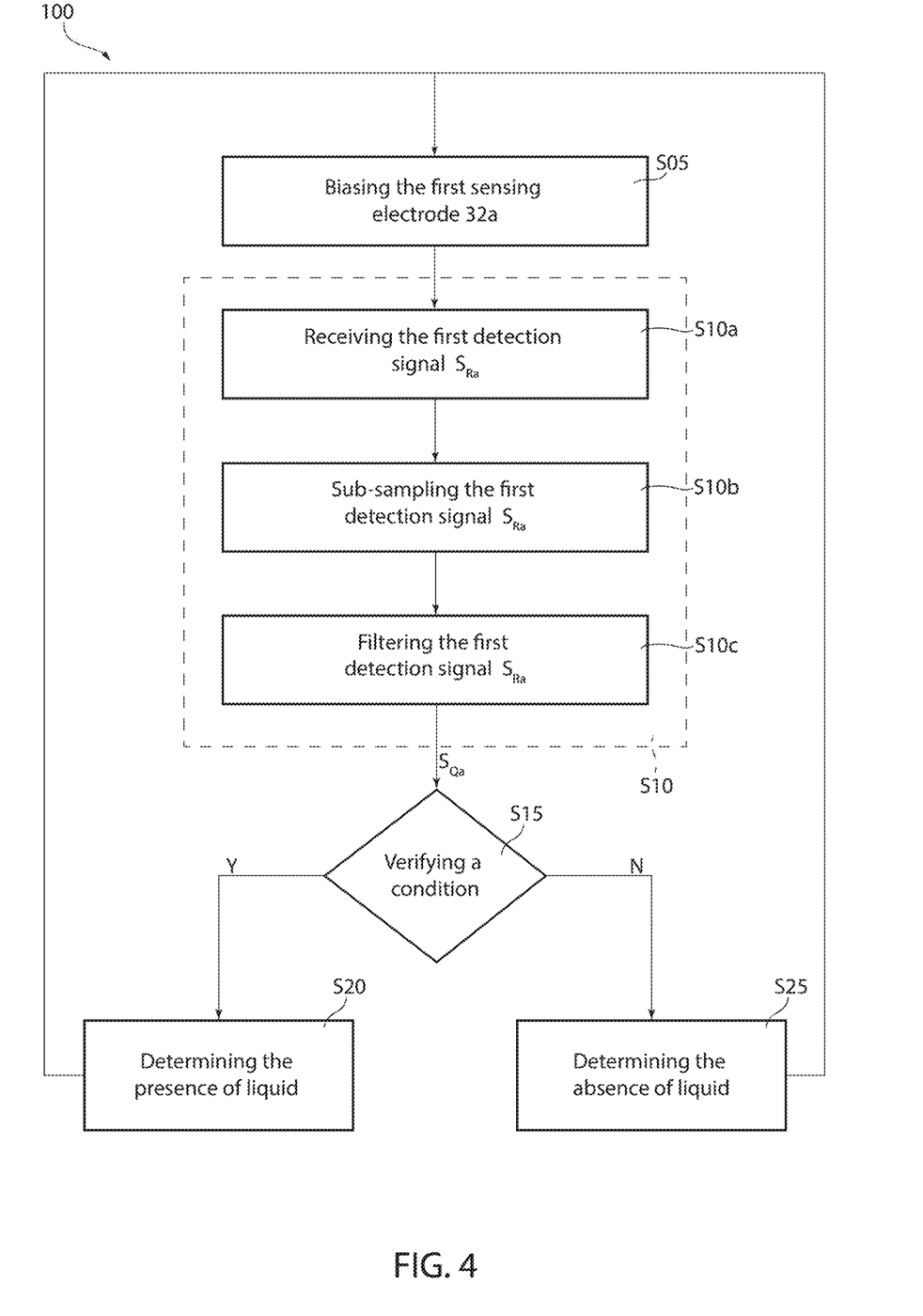
FIG. 4 is a block diagram showing a method for detecting the liquid, performed through the detection device of FIG. 1, according to an embodiment.

On the other hand, FIG. 4 shows the detection method 100 implemented in use by the detection device 50.

At a step S05 of the detection method 100, the processing module 52 biases the first sensing electrode 32a to the bias electric voltage $V_E$, through the first bias circuit 54. Furthermore, the reference electrode 30 is at the reference electric voltage $V_{GND}$.

At a step S10 of the detection method 100, consecutive to step S05, the sensor control unit 56 acquires, through the first sensing electrode 32a and while the latter is biased to the bias electric voltage $V_E$, a first charge variation signal $S_{Qa}$ indicative of the electric and/or electrostatic charge variation detected by the first sensing electrode 32a. For example, the first charge variation signal $S_{Qa}$ is stored in a buffer of the sensor control unit 56, to be able to be analyzed as a function of time as better discussed hereinbelow.

In particular, at a sub-step S10a of step S10, the sensor control unit 56 receives from the first sensing electrode 32a, while the latter is biased to the bias electric voltage $V_E$, the first detection signal $S_{Ra}$ indicative of the electric and/or electrostatic charge variation detected by the first sensing electrode 32a.

Subsequently, at a sub-step S10b of step S10, the sensor control unit 56 may perform a sub-sampling of the first detection signal $S_{Ra}$, for example with a sub-sampling factor comprised between about 2 and about 240 and for example equal to about 8.

Furthermore, at a sub-step S10c of step S10, the sensor control unit 56 may perform a filtering of the first detection signal $S_{Ra}$, for example with a low-pass filter with a cut-off frequency at a few Hz or tens of Hz, e.g., at about 10 Hz. This filtering may be made on the first detection signal $S_{Ra}$ received by the first sensing electrode 32a at sub-step S10a or on the first detection signal $S_{Ra}$ subsampled at sub-step S10b.

Furthermore, sub-steps S10b and S10c may be optional and therefore may not be performed or one of the two may be performed. Consequently, the first charge variation signal $S_{Qa}$ coincides with the first detection signal $S_{Ra}$ output from sub-steps S10a-S10c. For example, in case sub-steps S10b and S10c are not performed the first charge variation signal $S_{Qa}$ coincides with the first detection signal $S_{Ra}$ acquired at sub-step S10a while, in case sub-step S10b is performed and sub-step S10c is not, the first charge variation signal $S_{Qa}$ coincides with the first detection signal $S_{Ra}$ sub-sampled at sub-step S10b.

At a step S15 of the detection method 100, consecutive to step S10, the sensor control unit 56 verifies whether or not the first charge variation signal $S_{Qa}$ is indicative of the presence of the liquid 20 on the main surface 10b, at the first sensing electrode 32a. In other words, the sensor control unit 56 verifies whether or not the liquid 20 touches the electrodes 30 and 32a, contacting them electrically/electrostatically with each other.

In particular, this occurs by verifying whether the first charge variation signal $S_{Qa}$ is greater than a charge variation threshold value for a time interval greater than a time threshold interval (e.g., predefined or configurable by the user of the detection device 50, and for example comprised between a few hundred ms and a few seconds by default, e.g., equal to about 1 s). When this condition is confirmed, it is considered that, in this time interval wherein this condition applies, the first charge variation signal $S_{Qa}$ is indicative of the presence of the liquid 20 on the main surface 10b. The charge variation threshold value is defined during the design step as a function of factors such as the geometry and the area of the electrodes 30, 32, the electric/electrostatic properties of the liquid 20, etc.; for example, the charge variation threshold value is comprised between about 60% and about 97% of the saturation value of the first detection signal $S_{Ra}$, and for example is equal to about 90%.

In greater detail, the first charge variation signal $S_{Qa}$ is a time-variable signal, i.e., it has, at time instants consecutive to each other, respective values of the charge variation signal $S_{Qa}$. The condition at step S15 is determined (i.e., confirmed) when, at each time instant of this time interval greater than the time threshold interval, the respective value of the charge variation signal $S_{Qa}$ is greater than the charge variation threshold value.

If the first charge variation signal $S_{Qa}$ is indicative of the presence of the liquid 20 on the main surface 10b (output "Y" of step S15), the detection method 100 proceeds to a step S20, consecutive to step S15, wherein the sensor control unit 56 determines the actual presence of the liquid 20 on the main surface 10b, at the first sensing electrode 32a.

Optionally, at step S20, an output signal $S_{OUT}$ may also be generated, by the sensor control unit 56, indicative of the presence of the liquid 20 on the main surface 10b at the first sensing electrode 32a. For example, the output signal $S_{OUT}$ may be a digital signal which may assume a first value (e.g., 1) corresponding to the presence of the liquid 20 at the first sensing electrode 32a, or a second value (e.g., 0) corresponding to the absence of the liquid 20 at the first sensing electrode 32a; in this case, during the time interval wherein the condition at step S15 is confirmed, the output signal $S_{OUT}$ assumes the first value.

If the first charge variation signal $S_{Qa}$ is not indicative of the presence of the liquid 20 on the main surface 10b (output "N" of step S15), the detection method 100 proceeds to a step S25, consecutive to step S15, wherein the sensor control unit 56 determines the absence of the liquid 20 on the main surface 10b, at the first sensing electrode 32a.

Optionally, at step S20, the output signal $S_{OUT}$ may also be generated, by the sensor control unit 56, indicative of the absence of the liquid 20 on the main surface 10b at the first sensing electrode 32a. For example, in this case the output signal $S_{OUT}$ assumes the second value.

At the end of steps S20 or S25, the detection method 100 terminates or returns to step S05 to repeat the previously described steps again and in an iterative manner.

In particular, the position of the first sensing electrode 32a on the inner surface of the first side wall 10b allows detecting whether the liquid 20 has reached, within the container 10, a predefined level given by the first distance $D_1$. In other words, since the first detection signal $S_{Ra}$ goes from the baseline value to the saturation value when the liquid 20 comes into direct electric/electrostatic contact with the first sensing electrode 32a, having the first sensing electrode 32a on the inner surface of the first side wall 10b and at the first distance $D_1$ from the inner surface of the lower wall 10a implies that the switching of the first detection signal $S_{Ra}$ from the baseline value to the saturation value occurs when the liquid 20 reaches a first level in the container 10, corresponding to the first distance $D_1$. Consequently, the detection of the presence of the liquid 20 at the first sensing electrode 32a corresponds to the detection that the liquid 20 has reached this first level in the container 10. In particular, in this case the graph of FIG. 3B corresponds to the case wherein the container 10 is progressively filled (first time interval) until the liquid 20 reaches and possibly exceeds the first level of liquid (second time interval); after which the container 10 is emptied and the level of liquid 20 goes back to being lower than the first level (third time interval).

In this manner, knowing the structural parameters of the container 10 (e.g., the area of the inner surface of the lower wall 10a) it is possible to have an estimate of the volume of the liquid 20 present in the container 10.

Similarly, the level of the liquid 20 in the container 10 may be detected more accurately, using a plurality of sensing electrodes 32 placed at different distances from each other from the inner surface of the lower wall 10a. This allows a multi-level detection of the liquid 20 in the container 10 to be implemented.

Figure 5:
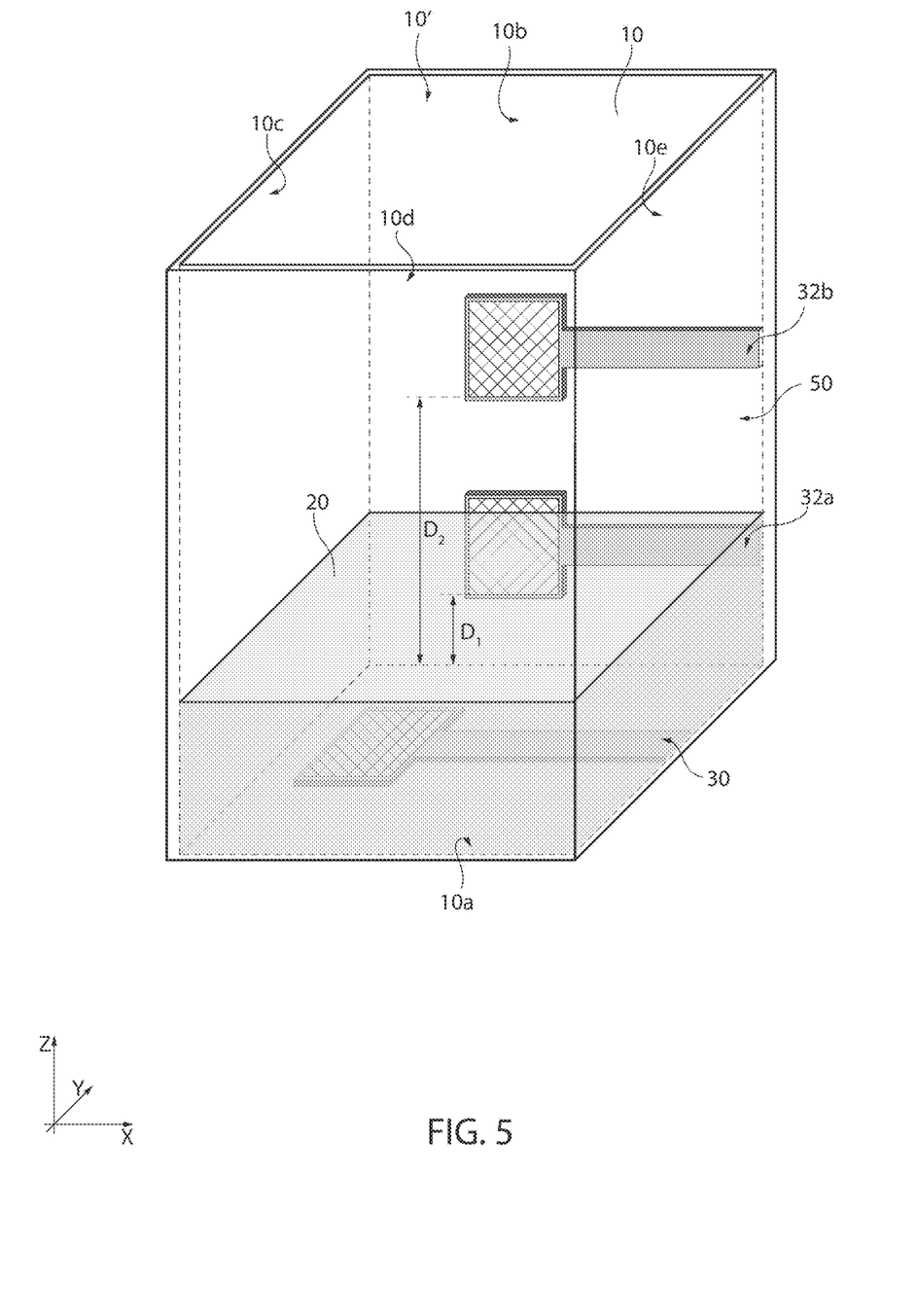
FIGS. 5 and 6 show the detection system, according to respective and further embodiments of the present disclosure.

In particular, FIG. 5 shows the exemplary embodiment of the detection device 50 wherein two sensing electrodes 32 are present, in particular the first sensing electrode 32a and a second sensing electrode 32b, which allow the presence of the liquid 20 at the first level and at a second level to be detected. Nevertheless, it is evident that the present discussion applies in a similar manner to the case of N sensing electrodes 32 (with N>2), in order to detect N respective levels of the liquid 20 in the container 10.

In detail, the second sensing electrode 32b extends on the inner surface of one of the side walls 10b-10e (in detail of the first side wall 10b), at a different height from that of the first sensing electrode 32a. In other words, the second sensing electrode 32b has a second distance $D_2$ from the inner surface of the lower wall 10a, which is different from the first distance $D_1$ and which therefore defines a second level of liquid 20 different from the first level. For example, $D_2 > D_1$ and therefore the second level is greater than the first level. The second sensing electrode 32b may be on the same or a different surface than the first sensing electrode 32a.

In the case of FIG. 5, steps S05-S25 are performed also for a second charge signal $S_{Qb}$ acquired through the second sensing electrode 32b, for example simultaneously and in parallel with the first charge signal $S_{Qa}$ acquired through the first sensing electrode 32a. In this manner it is possible to have, at each instant, information on the presence/absence of the liquid at each sensing electrode 32a, 32b. For example, the case wherein the first sensing electrode 32a is indicative of the presence of the liquid 20 and the second sensing electrode 32b is indicative of the absence of the liquid 20 corresponds to the situation wherein the liquid 20 has a level comprised between the first and the second levels, while the case wherein both sensing electrodes 32a, 32b are indicative of the presence of the liquid 20 corresponds to the situation wherein the liquid 20 has a higher level than the second level.

Figure 6:
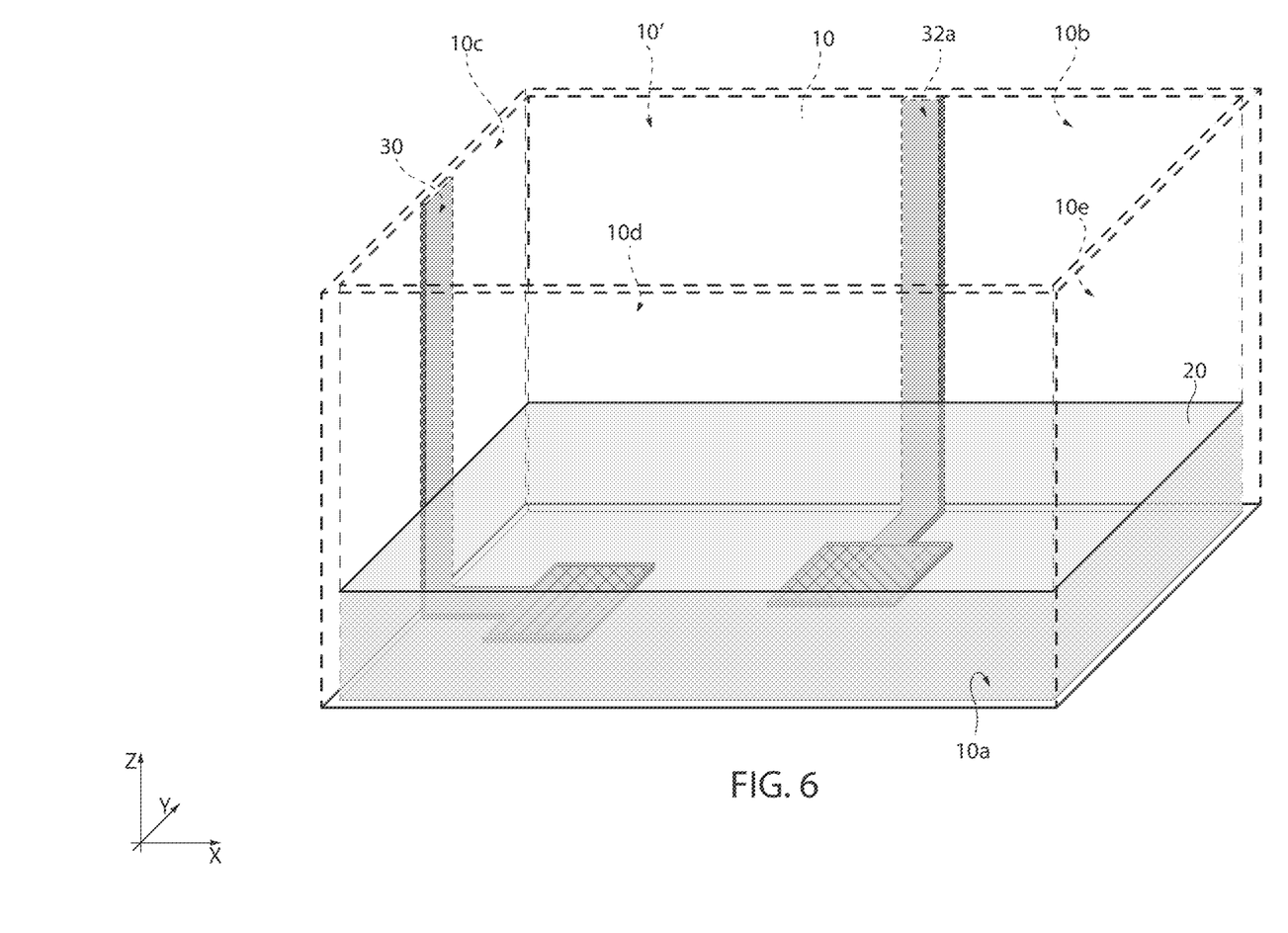

Furthermore, FIG. 6 shows a further embodiment of the detection device 50, wherein the level of the liquid 20 is not detected but its presence or absence in the container 10 is.

For this purpose, both the reference electrode 30 and the first sensing electrode 32a extend on the inner surface of the lower wall 10a. In this manner, as soon as the liquid 20 is present at the bottom of the container 10, the mutual transfer of electric and/or electrostatic charge occurs between the electrodes 30 and 32a and the first charge variation signal $S_{Qa}$ acquired through the first sensing electrode 32a is indicative of the presence of the liquid 20.

This is particularly useful in case it is desirable to detect leaks of the liquid 20 on a generic main surface of any body. In fact, in this case the body 10 may not be a container for liquid but a generic body which has a main surface which it is desired to check whether or not it is wetted by the liquid 20. For example, the body 10 might comprise machinery or a device placed under a container for liquids; in case there were leaks of liquid from the container, the latter might fall by gravity on the body 10, wetting the main surface thereof facing the container and causing potential damage and malfunctions thereof (e.g., the body 10 is part of industrial machinery or an apparatus such as a coffee machine and comprises electric/electronic circuits which might be compromised and damaged in case of water leaks from the overlying water tank).

From an examination of the characteristics of the various embodiments made according to the present disclosure the advantages that it affords are evident.

In particular, the detection device 50 and the detection method 100 allow the presence/absence of liquid 20 on a main surface of a body to be detected, through measurements of electric and/or electrostatic charge variations performed by electrodes 30, 32. This allows, for example, damage or malfunctions of electric/electronic components in industrial apparatuses or devices to be avoided, for example by reducing the risks for workers and users who use these apparatuses/devices.

In particular, when the body 10 is a container for liquid and the one or more first electrodes 32 extend at respective distances from the bottom of the container, the detection method 100 allows the level of the liquid 20 in the container 10 to be estimated.

The detection device 50, based on the measurement of electric and/or electrostatic charge variations, has small dimensions, is scalable, low cost and may be implemented on the basis of currently existing sensor devices (e.g., LSM6DSV16X, LSM6DSV16BX, ILPS22QS and ILPS28QSW of the present Applicant, which already integrate a sensor control unit 56 configurable to implement the detection method 100). In particular, since the detection device 50 does not carry out a capacitive measurement, it has fewer design limitations than known capacitive sensors. Furthermore, since the detection device 50 does not carry out a resistive measurement, it has energy consumptions that are low and much lower than known resistive sensors.

Finally, it is clear that modifications and variations may be made to the various embodiments described and illustrated herein without thereby departing from the scope of the present disclosure. For example, the different embodiments described may be combined with each other so as to provide further solutions.

Furthermore, the reference electrode 30 may be arranged in a different manner from what has been previously described, provided that it is in direct electric/electrostatic contact with the liquid 20 when the latter is present at the first sensing electrode 32a (i.e., when the latter and the liquid 20 are in direct electric and/or electrostatic contact with each other). For example, the reference electrode 30 may be on the second side wall 10c or on any of the side walls 10b-10e, or on the lower wall 10a as shown for example in FIGS. 5 and 6. Furthermore, the reference electrode 30 may also be the same body 10 or a part thereof in direct contact with the liquid 20, when the body 10 or this part thereof are of electrically conductive material (e.g., metal).

A method (100) for detecting the presence of a liquid (20) on a main surface (10a; 10b) of a body (10), may be performed through a detection device (50) including a processing module (52), a reference electrode (30) and a first sensing electrode (32a) which are electrically coupled to the processing module (52), wherein the processing module (52) includes a first bias circuit (54) and a sensor control unit (56) electrically coupled to the reference electrode (30) and, through the first bias circuit (54), to the first sensing electrode (32a), wherein the reference electrode (30) is at a reference electric voltage ($V_{GND}$) and, when the liquid (20) is present on the main surface (10a; 10b) at the first sensing electrode (32a), it is in direct electric and/or electrostatic contact with the liquid (20), wherein the first sensing electrode (32a) extends on the main surface (10a; 10b) and is configured to detect an environmental electric and/or electrostatic charge variation which, when the liquid (20) is on the main surface (10a; 10b) and in direct electric and/or electrostatic contact with the first sensing electrode (32a), is caused by the transfer of electric and/or electrostatic charge between the first sensing electrode (32a) and the reference electrode (30) through the liquid (20), the method including the steps of: biasing (S05), by the first bias circuit (54), the first sensing electrode (32a) to a bias electric voltage ($V_E$) different from the reference electric voltage ($V_{GND}$); while the first sensing electrode (32a) is biased to the bias electric voltage ($V_E$), acquiring (S10), by the sensor control unit (56), a first charge variation signal ($S_{Qa}$) indicative of the electric and/or electrostatic charge variation detected by the first sensing electrode (32a); verifying (S15), by the sensor control unit (56), whether the first charge variation signal ($S_{Qa}$) is indicative of the presence of the liquid (20) on the main surface (10a; 10b), at the first sensing electrode (32a); and if the first charge variation signal ($S_{Qa}$) is indicative of the presence of the liquid (20) on the main surface (10a; 10b), determining (S20), by the sensor control unit (56), the presence of the liquid (20) on the main surface (10a; 10b) at the first sensing electrode (32a).

The method may further include the step of, if the first charge variation signal ($S_{Qa}$) is not indicative of the presence of the liquid (20) on the main surface (10a; 10b), determining (S25), by the sensor control unit (56), the absence of the liquid (20) on the main surface (10a; 10b) at the first sensing electrode (32a).

The step of determining the presence of the liquid (20) on the main surface (10a; 10b) may include generating an output signal ($S_{OUT}$) indicative of the presence of the liquid (20) on the main surface (10a; 10b) at the first sensing electrode (32a).

The step of verifying whether the first charge variation signal ($S_{Qa}$) is indicative of the presence of the liquid (20) on the main surface (10a; 10b) may include verifying whether the first charge variation signal ($S_{Qa}$) is greater than a charge variation threshold value for a time interval greater than a time threshold interval, the first charge variation signal ($S_{Qa}$) being indicative of the presence of the liquid (20) on the main surface (10a; 10b) in said time interval wherein the first charge variation signal ($S_{Qa}$) is greater than the charge variation threshold value.

The first charge variation signal ($S_{Qa}$) may have, at time instants consecutive to each other, respective values of the charge variation signal ($S_{Qa}$), and wherein the step of verifying whether the first charge variation signal ($S_{Qa}$) is greater than the charge variation threshold value comprises verifying whether, at each time instant of the time interval greater than the time threshold interval, the respective value of the charge variation signal ($S_{Qa}$) is greater than the charge variation threshold value.

The step of acquiring the first charge variation signal ($S_{Qa}$) may include: receiving (S10a), by the sensor control unit (56), a first detection signal ($S_{Ra}$) generated by the first sensing electrode (32a) and indicative of the electric and/or electrostatic charge variation detected by the first sensing electrode (32a); and generating, by the sensor control unit (56), the first charge variation signal ($S_{Qa}$) by sub-sampling (S10b) and/or low-pass filtering (S10c) the first detection signal ($S_{Ra}$).

The body (10) may be a container for liquid and comprises a lower wall (10a) and side walls (10b-10e) defining an inner space (10') for containing the liquid (20), the main surface (10b) being an inner surface, facing the inner space (10), of the lower wall (10a) or of one of said side walls (10b-10e), and wherein, when the main surface (10b) is the inner surface of one of said side walls (10b-10e), the step of determining the presence of the liquid (20) on the main surface (10b) comprises determining a first level of the liquid (20) in the container (10), said first level being identified by a first distance ($D_1$) between the first sensing electrode (32a) and the inner surface of the lower wall (10a).

The detection device (50) may further include at least one second sensing electrode (32b) electrically coupled to the processing module (52), wherein the processing module (52) further comprises a second bias circuit (54), the sensor control unit (56) being electrically coupled to the second sensing electrode (32b) through the second bias circuit (54), wherein the second sensing electrode (32b) extends on the inner surface of one of said side walls (10b-10e) at a second distance ($D_2$), with respect to the inner surface of the lower wall (10a), different from the first distance ($D_1$) and is configured to detect a respective environmental electric and/or electrostatic charge variation which, when the liquid (20) is on the main surface (10b) and in direct electric and/or electrostatic contact with the second sensing electrode (32b), is caused by the respective transfer of electric and/or electrostatic charge between the second sensing electrode (32b) and the reference electrode (30) through the liquid (20), the method may further include the steps of: biasing, by the second bias circuit (54), the second sensing electrode (32b) to the bias electric voltage ($V_E$); while the second sensing electrode (32b) is biased to the bias electric voltage ($V_E$), acquiring, by the sensor control unit (56), a second charge variation signal ($S_{Qb}$) indicative of the electric and/or electrostatic charge variation detected by the second sensing electrode (32b); verifying, by the sensor control unit (56), whether the second charge variation signal ($S_{Qb}$) is indicative of the presence of the liquid (20) on the main surface (10b), at the second sensing electrode (32b); and if the second charge variation signal ($S_{Qb}$) is indicative of the presence of the liquid (20) on the main surface (10b), determining, by the sensor control unit (56), the presence of the liquid (20) on the main surface (10a; 10b) at the second sensing electrode (32b), wherein the step of determining the presence of the liquid (20) on the main surface (10b) at the second sensing electrode (32b) comprises determining a second level of the liquid (20) in the container (10), said second level being identified by said second distance ($D_2$).

A detection device (50) for detecting the presence of a liquid (20) on a main surface (10a; 10b) of a body (10), may be summarized as including a processing module (52), a reference electrode (30) and a first sensing electrode (32a) which are electrically coupled to the processing module (52), wherein the processing module (52) comprises a first bias circuit (54) and a sensor control unit (56) electrically coupled to the reference electrode (30) and, through the first bias circuit (54), to the first sensing electrode (32a), wherein the reference electrode (30) is configured to be at a reference electric voltage ($V_{GND}$) and, when the liquid (20) is present on the main surface (10a; 10b) at the first sensing electrode (32a), it is configured to be in direct electric and/or electrostatic contact with the liquid (20), wherein the first sensing electrode (32a) is configured to extend on the main surface (10a; 10b) and is configured to detect an environmental electric and/or electrostatic charge variation which, when the liquid (20) is on the main surface (10a; 10b) and in direct electric and/or electrostatic contact with the first sensing electrode (32a), is caused by the transfer of electric and/or electrostatic charge between the first sensing electrode (32a) and the reference electrode (30) through the liquid (20), wherein the first sensing electrode (32a) is configured to be biased, by the first bias circuit (54), to a bias electric voltage ($V_E$) different from the reference electric voltage ($V_{GND}$); and wherein the sensor control unit (56) is configured to: while the first sensing electrode (32a) is biased to the bias electric voltage ($V_E$), acquire a first charge variation signal ($S_{Qa}$) indicative of the electric and/or electrostatic charge variation detected by the first sensing electrode (32a); verify whether the first charge variation signal ($S_{Qa}$) is indicative of the presence of the liquid (20) on the main surface (10a; 10b), at the first sensing electrode (32a); and if the first charge variation signal ($S_{Qa}$) is indicative of the presence of the liquid (20) on the main surface (10a; 10b), determine the presence of the liquid (20) on the main surface (10a; 10b) at the first sensing electrode (32a).

The first bias circuit (54) may include a first resistor ($R_1$) and a second resistor ($R_2$) coupled to each other through a central node (60) of the first bias circuit (54), wherein the central node (60) is interposed between the first sensing electrode (32a) and the sensor control unit (56), wherein the second resistor ($R_2$) extends between the central node (60) and a reference node (64) of the first bias circuit (54), which is configured to be at the reference electric voltage ($V_{GND}$), and wherein the first resistor ($R_1$) extends between the central node (60) and an electrical power source (62) configured to provide a power supply voltage ($V_{DD}$) such as to have the central node (60) at the bias electric voltage ($V_E$).

The body (10) may be a container for liquid and includes a lower wall (10a) and side walls (10b-10e) defining an inner space (10') for containing the liquid (20), the main surface (10b) being an inner surface, facing the inner space (10'), of one of said side walls (10b-10e), wherein a first distance between the first sensing electrode (32a) and the inner surface of the lower wall (10a) identifies a first level of the liquid (20) in the container (10), wherein the detection device (50) further comprises at least one second sensing electrode (32b) electrically coupled to the processing module (52), wherein the processing module (52) further comprises a second bias circuit (54), the sensor control unit (56) being electrically coupled to the second sensing electrode (32b) through the second bias circuit (54), wherein the second sensing electrode (32b) is configured to extend on the inner surface of one of said side walls (10b-10e) at a second distance, with respect to the inner surface of the lower wall (10a), different from the first distance and is configured to detect a respective environmental electric and/or electrostatic charge variation which, when the liquid (20) is on the main surface (10b) and in direct electric and/or electrostatic contact with the second sensing electrode (32b), is caused by the respective transfer of electric and/or electrostatic charge between the second sensing electrode (32b) and the reference electrode (30) through the liquid (20), the second distance identifying a second level of the liquid (20) in the container (10), wherein the second sensing electrode (32b) is configured to be biased, by the second bias circuit (54), to the bias electric voltage ($V_E$), and wherein the sensor control unit (56) is further configured to: while the second sensing electrode (32b) is biased to the bias electric voltage ($V_E$), acquire a second charge variation signal ($S_{Qb}$) indicative of the electric and/or electrostatic charge variation detected by the second sensing electrode (32b); verify whether the second charge variation signal ($S_{Qb}$) is indicative of the presence of the liquid (20) on the main surface (10b), at the second sensing electrode (32b); and if the second charge variation signal ($S_{Qb}$) is indicative of the presence of the liquid (20) on the main surface (10b), determine the presence of the liquid (20) on the main surface (10a; 10b) at the second sensing electrode (32b).

A detection system (1) may be summarized as including a detection device (50), according to any embodiment discussed above, and the body (10).

A computer program product may be summarized as being storable in a sensor control unit (56) of a detection device (50), the detection device (50) including a processing module (52), a reference electrode (30) and a first sensing electrode (32a) which are electrically coupled to the processing module (52), wherein the processing module (52) includes a first bias circuit (54) and the sensor control unit (56) electrically coupled to the reference electrode (30) and, through the first bias circuit (54), to the first sensing electrode (32a), wherein the reference electrode (30) is configured to be at a reference electric voltage ($V_{GND}$) and, when liquid (20) is present on a main surface (10a; 10b) of a body (10), at the first sensing electrode (32a), is configured to be in direct electric and/or electrostatic contact with the liquid (20), wherein the first sensing electrode (32a) extends on the main surface (10a; 10b) and is configured to detect an environmental electric and/or electrostatic charge variation which, when the liquid (20) is on the main surface (10a; 10b) and in direct electric and/or electrostatic contact with the first sensing electrode (32a), is caused by the transfer of electric and/or electrostatic charge between the first sensing electrode (32a) and the reference electrode (30) through the liquid (20), wherein the first bias circuit (54) is configured to bias the first sensing electrode (32a) to a bias electric voltage ($V_E$) different from the reference electric voltage ($V_{GND}$), the computer program being designed such that, when executed, the sensor control unit (56) becomes configured to: while the first sensing electrode (32a) is biased to the bias electric voltage ($V_E$), acquire (S10) a first charge variation signal ($S_{Qa}$) indicative of the electric and/or electrostatic charge variation detected by the first sensing electrode (32a); verify (S15) whether the first charge variation signal ($S_{Qa}$) is indicative of the presence of the liquid (20) on the main surface (10a; 10b), at the first sensing electrode (32a); and if the first charge variation signal ($S_{Qa}$) is indicative of the presence of the liquid (20) on the main surface (10a; 10b), determine (S20) the presence of the liquid (20) on the main surface (10a; 10b) at the first sensing electrode (32a).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
    biasing, by a first bias circuit of a detection device, a first sensing electrode to a bias electric voltage different from a reference electric voltage, the detection device including:
        a processing module including the first bias circuit and a sensor controller;
        a reference electrode electrically coupled to the processing module, the reference electrode configured to be set to the reference electric voltage; and
        the first sensing electrode electrically coupled to the processing module, the first sensing electrode extending on a main surface of a body, the sensor controller being electrically coupled to the reference electrode and electrically coupled to the first sensing electrode through the first bias circuit;
    while the first sensing electrode is biased to the bias electric voltage, acquiring, by the sensor controller, a first charge variation signal indicative of an electric or electrostatic charge variation detected by the first sensing electrode;
    verifying, by the sensor controller, whether the first charge variation signal is indicative of a presence of a liquid on the main surface, at the first sensing electrode; and
    if the first charge variation signal is indicative of the presence of the liquid on the main surface, determining, by the sensor controller, the presence of the liquid on the main surface at the first sensing electrode.

2. The method according to claim 1, further comprising:
    if the first charge variation signal is not indicative of the presence of the liquid on the main surface, determining, by the sensor controller, an absence of the liquid on the main surface at the first sensing electrode.

3. The method according to claim 1, wherein the determining of the presence of the liquid on the main surface includes generating an output signal indicative of the presence of the liquid on the main surface at the first sensing electrode.

4. The method according to claim 1, wherein the verifying of whether the first charge variation signal is indicative of the presence of the liquid on the main surface includes verifying whether the first charge variation signal is greater than a charge variation threshold value for a time interval greater than a time threshold interval, the first charge variation signal being indicative of the presence of the liquid on the main surface in the time interval in case the first charge variation signal is greater than the charge variation threshold value.

5. The method according to claim 4,
wherein the first charge variation signal has, at time instants consecutive to each other, respective values of the first charge variation signal, and
wherein the verifying of whether the first charge variation signal is greater than the charge variation threshold value includes verifying whether, at each time instant of the time interval greater than the time threshold interval, the respective value of the first charge variation signal is greater than the charge variation threshold value.

6. The method according to claim 1, wherein the acquiring of the first charge variation signal includes:
receiving, by the sensor controller, a first detection signal generated by the first sensing electrode and indicative of the electric or electrostatic charge variation detected by the first sensing electrode; and
generating, by the sensor controller, the first charge variation signal by sub-sampling or low-pass filtering the first detection signal.

7. The method according to claim 1,
wherein the body is a container for liquid and includes a base and side walls defining an inner space for containing the liquid, the main surface being an inner surface, facing the inner space, of the base or of one of the side walls, and
wherein, in case the main surface is the inner surface of one of the side walls, the determining of the presence of the liquid on the main surface includes determining a first level of the liquid in the container, the first level being identified by a first distance between the first sensing electrode and the inner surface of the base.

8. The method according to claim 7,
wherein the detection device includes at least one second sensing electrode electrically coupled to the processing module,
wherein the processing module includes a second bias circuit, the sensor controller being electrically coupled to the second sensing electrode through the second bias circuit,
wherein the second sensing electrode extends on the inner surface of one of the side walls at a second distance, with respect to the inner surface of the base, different from the first distance,
the method further includes:
biasing, by the second bias circuit, the second sensing electrode to the bias electric voltage;
while the second sensing electrode is biased to the bias electric voltage, acquiring, by the sensor controller, a second charge variation signal indicative of electric or electrostatic charge variation detected by the second sensing electrode;
verifying, by the sensor controller, whether the second charge variation signal is indicative of the presence of the liquid on the main surface and at the second sensing electrode; and
if the second charge variation signal is indicative of the presence of the liquid on the main surface and at the second sensing electrode, determining, by the sensor controller, the presence of the liquid on the main surface and at the second sensing electrode,
wherein the determining the presence of the liquid on the main surface and at the second sensing electrode includes determining a second level of the liquid in the container, the second level being identified by the second distance.

9. The method according to claim 1, wherein the first sensing electrode is configured to detect the electric or electrostatic charge variation which, when the liquid is on the main surface and in direct electric or electrostatic contact with the first sensing electrode, is caused by a transfer of electric or electrostatic charge between the first sensing electrode and the reference electrode through the liquid.

10. A device comprising:
a processing module including a first bias circuit and a sensor controller;
a reference electrode electrically coupled to the processing module, the reference electrode configured to be set to a reference electric voltage; and
a first sensing electrode electrically coupled to the processing module, the first sensing electrode extending on a main surface of a body, the first sensing electrode configured to be biased, by the first bias circuit, to a bias electric voltage different from the reference electric voltage, the sensor controller being electrically coupled to the reference electrode and electrically coupled to the first sensing electrode through the first bias circuit,
wherein the sensor controller is configured to:
while the first sensing electrode is biased to the bias electric voltage, acquire a first charge variation signal indicative of an electric or electrostatic charge variation detected by the first sensing electrode;
verify whether the first charge variation signal is indicative of a presence of a liquid on the main surface, at the first sensing electrode; and
if the first charge variation signal is indicative of the presence of the liquid on the main surface, determine the presence of the liquid on the main surface at the first sensing electrode.

11. The device according to claim 10,
wherein the first bias circuit includes a first resistor and a second resistor coupled to each other through a central node of the first bias circuit,
wherein the central node is interposed between the first sensing electrode and the sensor controller,
wherein the second resistor is between the central node and a reference node of the first bias circuit, is the reference node configured to be at the reference electric voltage, and
wherein the first resistor is between the central node and an electrical power source configured to provide a power supply voltage such as to have the central node at the bias electric voltage.

12. The device according to claim 10,
wherein the body is a container for liquid and includes a base and side walls defining an inner space for containing the liquid, the main surface being an inner surface, facing the inner space, of one of the side walls,
wherein a first distance between the first sensing electrode and the inner surface of the base identifies a first level of the liquid in the container, wherein the device includes at least one second sensing electrode electrically coupled to the processing module, wherein the processing module includes a second bias circuit, the sensor controller being electrically coupled to the second sensing electrode through the second bias circuit, wherein the second sensing electrode extends on the inner surface of one of the side walls at a second distance, with respect to the inner surface of the base, different from the first distance, the second distance identifying a second level of the liquid in the container, wherein the second sensing electrode is configured to be biased, by the second bias circuit, to the bias electric voltage, and wherein the sensor controller is configured to:
    while the second sensing electrode is biased to the bias electric voltage, acquire a second charge variation signal indicative of electric or electrostatic charge variation detected by the second sensing electrode;
    verify whether the second charge variation signal is indicative of the presence of the liquid on the main surface and at the second sensing electrode; and
    if the second charge variation signal is indicative of the presence of the liquid on the main surface and at the second sensing electrode, determine the presence of the liquid on the main surface and at the second sensing electrode.

13. The device according to claim 10, wherein the first charge variation signal is indicative of the presence of the liquid on the main surface in a case where the first charge variation signal is greater than a charge variation threshold value for a time interval greater than a time threshold interval.

14. The device according to claim 10, wherein the sensor controller is configured to:
    receive a first detection signal generated by the first sensing electrode and indicative of the electric or electrostatic charge variation detected by the first sensing electrode; and
    generate the first charge variation signal by sub-sampling or low-pass filtering the first detection signal.

15. The device according to claim 10,
wherein the body is a container for liquid and includes a base and side walls defining an inner space for containing the liquid, the main surface being an inner surface, facing the inner space, of the base or of one of the side walls, and wherein, in case the main surface is the inner surface of one of the side walls, the sensor controller is configured to determine a first level of the liquid in the container, the first level being identified by a first distance between the first sensing electrode and the inner surface of the base.

16. A non-transitory computer program product storable in a sensor controller of a detection device,
the detection device including a processing module including a first bias circuit and the sensor controller, a reference electrode electrically coupled to the processing module, the reference electrode configured to be set to a reference electric voltage, and a first sensing electrode electrically coupled to the processing module, the first sensing electrode extending on a main surface of a body, the sensor controller being electrically coupled to the reference electrode and electrically coupled to the first sensing electrode through the first bias circuit, the first bias circuit being configured to bias the first sensing electrode to a bias electric voltage different from the reference electric voltage, the computer program being designed such that, when executed, the sensor controller becomes configured to:
    while the first sensing electrode is biased to the bias electric voltage, acquire a first charge variation signal indicative of an electric or electrostatic charge variation detected by the first sensing electrode;
    verify whether the first charge variation signal is indicative of a presence of a liquid on the main surface, at the first sensing electrode; and
    if the first charge variation signal is indicative of the presence of the liquid on the main surface, determine the presence of the liquid on the main surface at the first sensing electrode.

17. The non-transitory computer program product according to claim 16, wherein the first charge variation signal is indicative of the presence of the liquid on the main surface in a case where the first charge variation signal is greater than a charge variation threshold value for a time interval greater than a time threshold interval.

18. The non-transitory computer program product according to claim 16, wherein the sensor controller becomes further configured to:
    receive a first detection signal generated by the first sensing electrode and indicative of the electric or electrostatic charge variation detected by the first sensing electrode; and
    generate the first charge variation signal by sub-sampling or low-pass filtering the first detection signal.

19. The non-transitory computer program product according to claim 16,
wherein the body is a container for liquid and includes a base and side walls defining an inner space for containing the liquid, the main surface being an inner surface, facing the inner space, of the base or of one of the side walls, and wherein, in case the main surface is the inner surface of one of the side walls, the sensor unit is configured to determine a first level of the liquid in the container, the first level being identified by a first distance between the first sensing electrode and the inner surface of the base.

* * * * *